United States Patent
Teng et al.

(10) Patent No.: US 8,739,531 B2
(45) Date of Patent: Jun. 3, 2014

(54) HYBRID POWER PLANT WITH WASTE HEAT RECOVERY SYSTEM

(75) Inventors: Ho Teng, Canton, MI (US); Gerhard Regner, San Diego, CA (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 395 days.

(21) Appl. No.: 13/143,558

(22) PCT Filed: Jan. 13, 2010

(86) PCT No.: PCT/US2010/020876
§ 371 (c)(1),
(2), (4) Date: Jul. 7, 2011

(87) PCT Pub. No.: WO2010/083198
PCT Pub. Date: Jul. 22, 2010

(65) Prior Publication Data
US 2011/0271677 A1    Nov. 10, 2011

Related U.S. Application Data

(60) Provisional application No. 61/144,232, filed on Jan. 13, 2009.

(51) Int. Cl.
*F01K 23/10* (2006.01)
*F02G 3/00* (2006.01)
*F01K 23/06* (2006.01)
*F01K 25/00* (2006.01)

(52) U.S. Cl.
USPC .............. 60/618; 60/616; 60/670; 60/671

(58) Field of Classification Search
USPC ........... 60/618, 616, 614, 624, 646, 660, 668, 60/670, 671, 715; 62/236
IPC .......................... F01K 23/06,23/10; F01N 3/02
See application file for complete search history.

(56) References Cited

U.S. PATENT DOCUMENTS

| | | | |
|---|---|---|---|
| 2,749,049 A | | 6/1956 | Smith |
| 3,228,189 A | * | 1/1966 | Baker ............................. 60/618 |

(Continued)

FOREIGN PATENT DOCUMENTS

| | | | | |
|---|---|---|---|---|
| GB | 2402172 A | * | 12/2004 | ................ F02C 1/04 |
| JP | 2000248922 A | * | 9/2000 | ................ F01N 3/02 |

(Continued)

OTHER PUBLICATIONS

International Preliminary Report on Patentability for International application No. PCT/US2010/020876 mailed Jul. 28, 2011.

(Continued)

*Primary Examiner* — Thai Ba Trieu
(74) *Attorney, Agent, or Firm* — Harness, Dickey & Pierce P.L.C.

(57) ABSTRACT

A hybrid power plant includes a waste heat recovery (WHR) system having an expander driven by waste heat from an internal combustion engine. The expander, which is rotary in one example, rotationally drives a first pump and alternator with which the expander may be packaged as a single unit. The first pump circulates a working fluid when the WHR system is in use to charge an electrical storage device. A second pump is employed to circulate the working fluid when the first pump is not in use, for example. The expander can be bypassed to divert the working fluid to a heater core used to heat engine coolant during cold start conditions, for example.

19 Claims, 2 Drawing Sheets

(56) References Cited

U.S. PATENT DOCUMENTS

| | | | |
|---|---|---|---|
| 3,774,397 A | 11/1973 | Engdahl | |
| 4,021,677 A | 5/1977 | Rosen et al. | |
| 4,069,672 A * | 1/1978 | Milling | 60/618 |
| 4,300,353 A | 11/1981 | Ridgway | |
| 4,334,409 A * | 6/1982 | Daugas | 60/618 |
| 4,351,155 A | 9/1982 | Anderson et al. | |
| 4,901,531 A | 2/1990 | Kubo et al. | |
| 4,996,845 A | 3/1991 | Kim | |
| 5,000,003 A | 3/1991 | Wicks | |
| 5,121,607 A | 6/1992 | George, Jr. | |
| 5,327,987 A | 7/1994 | Abdelmalek | |
| 5,385,211 A | 1/1995 | Carroll | |
| 5,555,731 A * | 9/1996 | Rosenblatt | 60/671 |
| 5,680,764 A | 10/1997 | Viteri | |
| 6,247,316 B1 | 6/2001 | Viteri | |
| 6,414,832 B1 | 7/2002 | Crecelius et al. | |
| 6,450,283 B1 | 9/2002 | Taggett | |
| 6,523,349 B2 | 2/2003 | Viteri | |
| 6,564,757 B2 | 5/2003 | Suzuki et al. | |
| 6,725,662 B2 | 4/2004 | Baba et al. | |
| 6,817,182 B2 | 11/2004 | Clawson | |
| 6,928,820 B2 * | 8/2005 | Inaba et al. | 60/618 |
| 6,945,029 B2 | 9/2005 | Viteri | |
| 7,056,251 B2 | 6/2006 | Ibaraki | |
| 7,181,919 B2 | 2/2007 | Uno et al. | |
| 7,454,910 B2 | 11/2008 | Hamada et al. | |
| 7,454,912 B2 | 11/2008 | Yamanaka et al. | |
| 7,467,605 B2 | 12/2008 | Szalony et al. | |
| 7,475,541 B2 | 1/2009 | Ibaraki et al. | |
| 7,531,912 B2 | 5/2009 | Tamura et al. | |
| 7,997,077 B2 * | 8/2011 | Corley | 60/618 |
| 2004/0187506 A1 | 9/2004 | Iwanami et al. | |
| 2004/0255586 A1 | 12/2004 | Hamada et al. | |
| 2005/0228553 A1 | 10/2005 | Tryon | |
| 2006/0201154 A1 | 9/2006 | Kato et al. | |
| 2007/0126236 A1 | 6/2007 | Tamura et al. | |
| 2007/0245737 A1 | 10/2007 | Inaba et al. | |
| 2007/0295737 A1 | 12/2007 | Del Val Catala | |
| 2008/0021628 A1 | 1/2008 | Tryon | |
| 2008/0027639 A1 | 1/2008 | Tryon | |
| 2008/0051977 A1 | 2/2008 | Tryon | |
| 2008/0110171 A1 | 5/2008 | Schmeltz | |
| 2009/0133646 A1 * | 5/2009 | Wankhede et al. | 123/41.31 |
| 2011/0023483 A1 * | 2/2011 | Berger et al. | 60/618 |
| 2011/0192163 A1 * | 8/2011 | Kasuya | 60/624 |
| 2011/0271674 A1 * | 11/2011 | Teng et al. | 60/614 |
| 2012/0073294 A1 * | 3/2012 | Enokijima et al. | 60/660 |
| 2012/0073295 A1 * | 3/2012 | Enokijima et al. | 60/660 |
| 2012/0131919 A1 * | 5/2012 | Held et al. | 60/646 |
| 2012/0324891 A1 * | 12/2012 | Raab et al. | 60/668 |

FOREIGN PATENT DOCUMENTS

| | | | |
|---|---|---|---|
| JP | 2008143522 | 6/2008 | |
| JP | 2010229844 A * | 10/2010 | F01K 23/10 |
| WO | 03033881 A1 | 4/2003 | |

OTHER PUBLICATIONS

M. Kadota and K. Yamamoto, "Advanced Transient Simulation on Hybrid Vehicle Using Rankine Cycle System," SAE Technical Paper Series 2008-01-0310; 2008 World Congress, Detroit, Michigan, Apr. 14-17, 2008.

Ho Teng, Gerhard Regner and Chris Cowland, "Achieving High Engine Efficiency for Heavy-Duty Diesel Engines by Waste Heat Recovery Using Supercritical Organic-Fluid Rankine Cycle," SAE Technical Paper Series, Commercial Vehicle Engineering Congress and Exhibition, Chicago, Illinois, Oct. 31-Nov. 2, 2006.

International Search Report and Written Opinion of the International Searching Authority for International application No. PCT/US2010/020876 mailed May 20, 2010.

* cited by examiner

HYBRID POWER PLANT WITH WASTE HEAT RECOVERY SYSTEM

This application claims priority to U.S. Provisional Application No. 61/144,232, which was filed on Jan. 13, 2009.

BACKGROUND

This disclosure relates to a hybrid power plant system that incorporates a waste heat recovery system.

High fuel economy and low emissions are two design parameters for on-road vehicle power plants. A majority of passenger cars and light-duty trucks are powered with gasoline engines. For these vehicles, poor fuel economy is encountered during engine idling, such as during stops at traffic lights. Additionally, approximately 70%-90% of total hydrocarbon and carbon monoxide emissions occurred during the first two minutes after the engine has been started from a cold state. Subsequent to a cold start, the efficiency of a catalytic converter is low while the engine is operating in an open loop control state.

Forty-two volt hybrid systems have been proposed with an integrated starter/generator (ISG) to reduce engine idling conditions and recover some vehicle braking energy. With this type of hybrid system, the engine is shut off during stops, for example, while waiting at traffic lights. Thus, the overall fuel economy is significantly improved. Typically, some hybrid systems also incorporate a waste heat recovery (WHR) Rankin cycle to charge batteries by using waste heat from the engine to drive an alternator. Although such hybrid systems with waste heat recovery have done much to improve fuel economy and reduce emissions, there are opportunities for improvement.

SUMMARY

In one example, a hybrid power plant system is disclosed that includes an engine having an exhaust system. An exhaust cooler is in fluid communication with the exhaust system. A working fluid loop is in fluid communication with the exhaust cooler and is configured to receive heat from the exhaust system. A rotary expander is arranged in the working fluid loop downstream from the exhaust cooler. An alternator and a pump are configured to be rotationally driven by the rotary expander. The pump is arranged in the working fluid loop and is configured to pump the fluid therethrough in response to rotation from the rotary expander.

In another example, a hybrid power plant system is disclosed that includes an engine having an exhaust system. An exhaust cooler is in fluid communication with the exhaust system. A working fluid loop is in fluid communication with the exhaust cooler and is configured to receive heat from the exhaust system. An expander is arranged in the working fluid loop, and a first pump is configured to be rotationally driven by the expander. The first pump is arranged in the working fluid loop and is configured to pump working fluid therethrough in response to rotation from the expander. A second pump is arranged in the working fluid loop and is configured to pump the working fluid therethrough in response to an input device during an operating condition.

In another example, a hybrid power plant system includes an engine having an exhaust system. An exhaust cooler is in fluid communication with the exhaust system. A liquid coolant loop is in fluid communication with the engine and includes a coolant bypass loop. A working fluid loop is in fluid communication with the exhaust cooler and is configured to receive heat from the exhaust system. The working fluid loop including an expander bypass loop. An expander is arranged in the working fluid loop downstream from the exhaust cooler and is configured to drive an alternator. A heater core is in fluid communication with the coolant bypass loop and the expander bypass loop. A bypass control system including at least one control valve arranged in the working fluid loop and configured to divert working fluid in the working fluid loop around the expander and to the heater core in response to an operating condition.

BRIEF DESCRIPTION OF THE DRAWINGS

The disclosure can be further understood by reference to the following detailed description when considered in connection with the accompanying drawings wherein.

DETAILED DESCRIPTION

Figure 1:
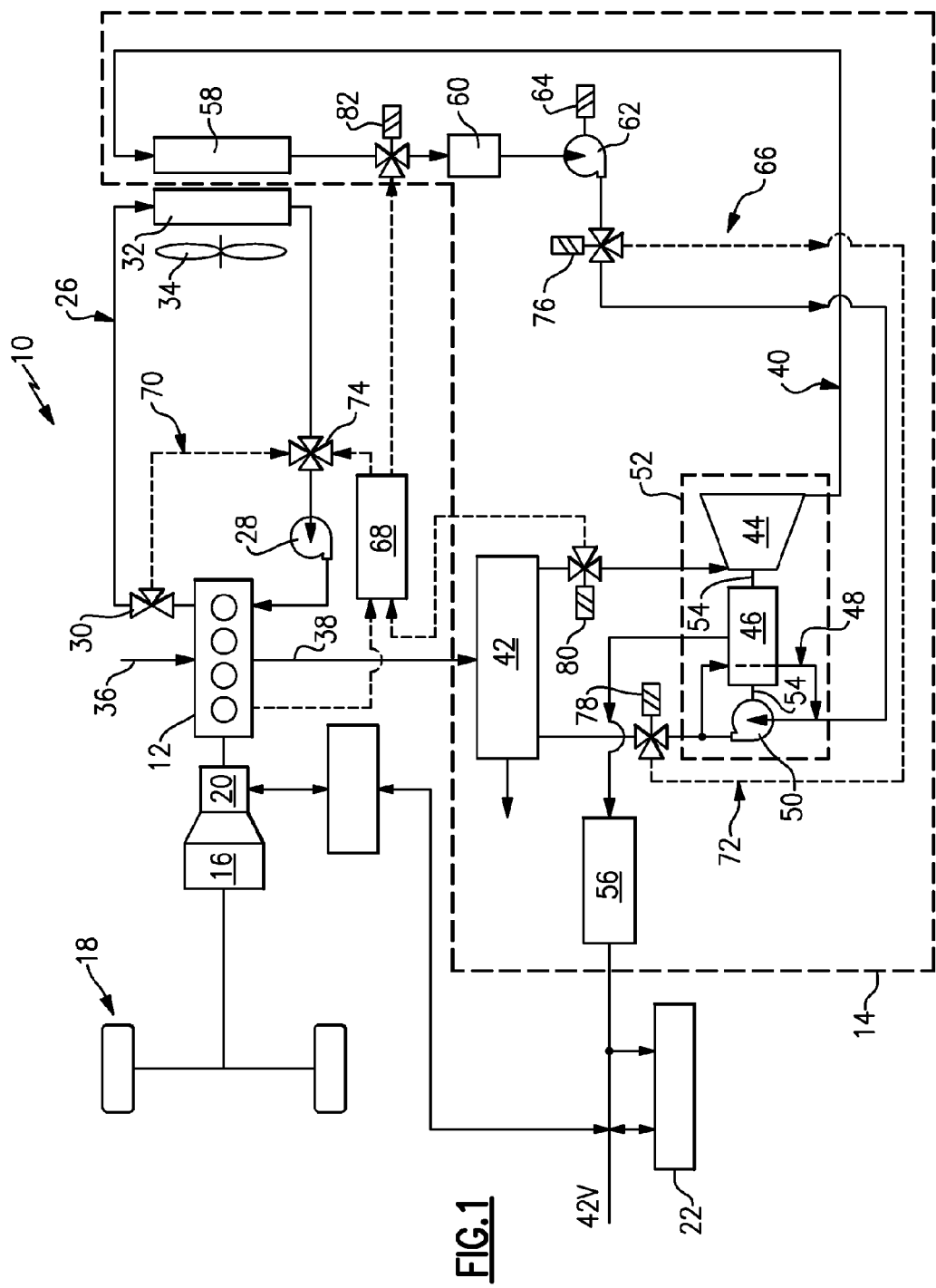
FIG. 1 is a schematic view of a hybrid power plant with a waste heat recovery system.

A hybrid power plant 10 is schematically illustrated in FIG. 1. The power plant 10 includes an internal combustion engine 12 coupled to a transmission 16. In one example, the engine 12 is gasoline powered, although other fuels may be used. The engine 12 drives vehicle wheels 18 through the transmission 16.

An engine WHR system 14, such as a Rankine cycle, is used to recover waste heat from the engine 12 and drive an integrated starter/generator (ISG) 20 that is coupled to the transmission 16, for example. The WHR system 14 charges an electrical storage device 22 that supplies power to the ISG 20, for example, to start the vehicle when the engine has been shut off, to rotationally drive the wheels 18. The electrical storage device 22 is batteries of a 42 volt system, for example.

The power plant 10 includes a coolant loop 26 having a pump 28 that circulates a liquid coolant, such as water and ethylene glycol, through the engine 12. The coolant loop 26 includes a thermostat 30 that selectively provides the coolant to a radiator 32 depending upon a temperature of the coolant. The thermostat 30 may be passive or actively controlled. A fan 34 is arranged near the radiator 32 to cool the coolant at a predetermined temperature.

The engine 12 includes an intake system 36 (providing charge air to the engine 12) and an exhaust system 38. A working fluid loop 40 includes an exhaust cooler 42 that receives exhaust from the exhaust system 38. In one example, the exhaust cooler 42 is integrated with a catalytic converter in the exhaust system 38. The exhaust gases flowing through the exhaust cooler 42 transfers heat to a working fluid, such as a water and ethanol mixture (e.g., 50/50 mixture), within the working fluid loop 40. The heated working fluid is provided from the exhaust cooler 42 to an expander 44, which rotationally drives an alternator 46 during a charging mode. It should be understood in this application that "alternator" and "generator" are intended to have the same meaning. The alternator 46 charges the electrical storage device 22 through an inverter 56.

A pump 50, which may be a high pressure pump, is also rotationally driven by the expander 44 to circulate the working fluid in the working fluid loop 40 when the WHR system 14 is in the charging mode. In one example, the expander 44 is a rotary expander, for example, a turbine or a sliding vane-type expander. In the case of a rotary expander, the expander 44, alternator 46 and high pressure pump 50 may be packaged in a common housing 52 and driven by a common shaft 54 arranged within the housing 52. The higher speed at which a rotary expander is capable of rotating enables a smaller alternator and pump to be used, so that a single, integrated unit is feasible. Moreover, rotary expanders need not have a separate lubrication system, since the working fluid is sufficient in this regard. The working fluid loop 40 may include a cooling circuit 48 that is used to cool the alternator 46.

The working fluid loop 40 includes a condenser 58 that condenses the working fluid expelled from the expander 44. The condensed working fluid is collected in a reservoir 60. A low pressure pump 62, which may be of the centrifugal type, is arranged within the working fluid loop 40 and is driven by an electric motor 64 in one example. The low pressure pump 62 controls the working fluid flow rate. The low pressure pump 62 may be used to circulate fluid within the working fluid loop 40 during the charging mode, and is also used to circulate the working fluid when the WHR system 14 is in a bypass mode when the high pressure pump 50 is not being driven by the expander 44.

The WHR system 14 includes a bypass control system 66 that diverts the working fluid around the expander 44 during the bypass mode, such as subsequent to an engine cold start. The bypass control system 66 includes a heater core 68 in fluid communication with both the coolant loop 26 and the working fluid loop 40 via a coolant bypass loop 70 and an expander bypass loop 72, respectively.

Figure 2:
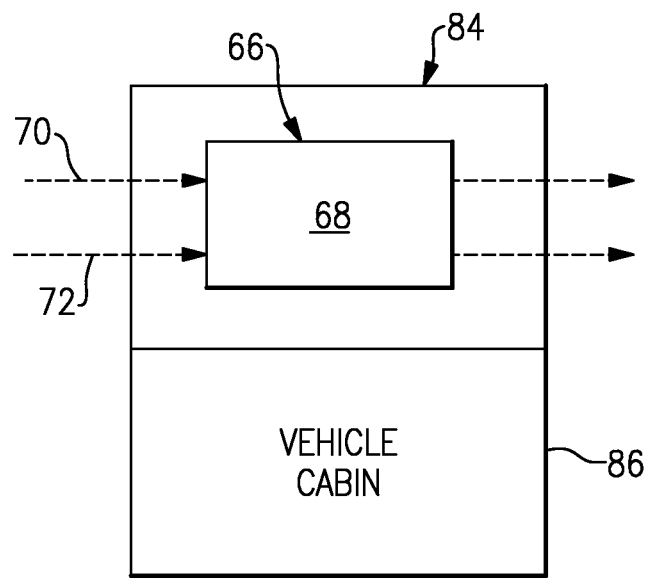
FIG. 2 is a schematic of a heating, ventilation and cooling (HVAC) system for a vehicle cabin.

Referring to FIG. 2, the heater core 68 is part of an HVAC system 84, in addition to the bypass control system. The HVAC system 84 is used to heat air for a vehicle cabin 86. As a result, a separate heat exchanger need not be employed.

In the example, returning to FIG. 1, a first control valve 76 is arranged between the low pressure pump 62 and the high pressure pump 50. A second control valve 78 is arranged between the high pressure pump 50 and the exhaust cooler 42. A third control valve 80 is arranged between the exhaust cooler 42 and the expander 44. A fourth control valve 82 is arranged between the heater core 68 and the low pressure pump 62, and between the condenser 58 and the reservoir 60. A mixer 74 is arranged in the coolant loop 26 and the coolant bypass loop 70. The mixer may be passively or actively controlled.

Figure 3:
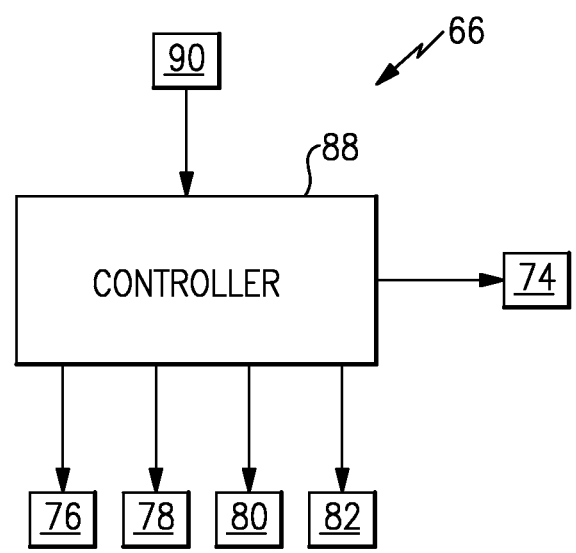
FIG. 3 is a schematic illustrating a bypass control system for the hybrid power plant illustrated in FIG. 1.

Referring to FIG. 3, a controller 88 is illustrated in communication with the first, second, third and fourth control valves 76, 78, 80, 82. In one example, the mixer 74 may be an active control valve that is in communication with the controller 88. An operating condition input 90, such as an indication of a cold engine start condition, is communicated to the controller 88. In response to the operating condition, such as a cold engine start, the controller 88 commands the first, second, third and fourth control valves 76, 78, 80, 82 to positions that would bypass the expander 44 and high pressure pump 50, thus, diverting the heated working fluid from the exhaust cooler 42 to the heater core 68. The heated working fluid within the heater core 68 transfers heat to the coolant in the coolant bypass loop 70, which is transferred to the engine 12 enabling the engine 12 to heat up more quickly thereby reducing emissions after a cold start.

Although an example embodiment has been disclosed, a worker of ordinary skill in this art would recognize that certain modifications would come within the scope of the claims. For that reason, the following claims should be studied to determine their true scope and content.

What is claimed is:

1. A hybrid power plant system comprising:
   an engine including an exhaust system;
   an exhaust cooler in fluid communication with the exhaust system;
   a working fluid loop in fluid communication with the exhaust cooler and configured to receive heat from the exhaust system;
   a rotary expander arranged in the working fluid loop downstream from the exhaust cooler;
   an alternator and a pump configured to be rotationally driven by the rotary expander, the pump arranged in the working fluid loop and configured to pump working fluid therethrough in response to rotation from the rotary expander;
   a heater core in fluid communication with the working fluid loop and operable to transfer heat to the engine; and
   a valve operable to bypass the rotary expander and the pump to direct the working fluid from the exhaust cooler to the heater core to supply heat to the engine.

2. The system according to claim 1, wherein the rotary expander is one of a turbine and a sliding vane expander.

3. The system according to claim 1, comprising a housing, the rotary expander, the alternator and the pump disposed within the housing providing an integrated unit.

4. The system according to claim 3, comprising a shaft common to the rotary expander, the alternator and the pump, the shaft configured to be rotationally driven by the rotary expander.

5. The system according to claim 1, comprising a cooling circuit in fluid communication with the working fluid loop and the alternator configured to cool the alternator with working fluid.

6. A hybrid power plant system comprising:
   an engine including an exhaust system;
   an exhaust cooler in fluid communication with the exhaust system;
   a working fluid loop in fluid communication with the exhaust cooler and configured to receive heat from the exhaust system, and an expander arranged in the working fluid loop;
   a first pump configured to be rotationally driven by the expander, the first pump arranged in the working fluid loop and configured to pump working fluid therethrough in response to rotation from the expander; and
   a second pump arranged in the working fluid loop and configured to pump the working fluid therethrough in a bypass mode, the bypass mode causing the working fluid to bypass the expander and the first pump in response to an operating condition of the hybrid power plant system.

7. The system according to claim 6, comprising an alternator coupled to the expander and configured to be rotationally driven by the expander in an operational state, the first and second pumps configured to circulate the working fluid through the expander in the operational state.

8. The system according to claim 7, comprising a housing, the expander, the alternator and the first pump disposed within the housing providing an integrated unit.

9. The system according to claim 6, wherein the operating condition is a cold start condition.

10. The system according to claim 9, comprising a coolant loop in fluid communication with the engine, and a heater core in fluid communication with the coolant loop and the working fluid loop.

11. The system according to claim 10, wherein the first pump is idled and the second pump is driven in response to the operating condition.

12. The system according to claim 11, wherein the second pump circulates the working fluid through the heater core in response to the operating condition.

13. The system according to claim 10, wherein the second pump circulates the working fluid through the heater core in response to the operating condition.

14. A hybrid power plant system comprising:
an engine including an exhaust system;
an exhaust cooler in fluid communication with the exhaust system;
a liquid coolant loop in fluid communication with the engine, the liquid cooling loop including a coolant bypass loop;
a working fluid loop in fluid communication with the exhaust cooler and configured to receive heat from the exhaust system, the working fluid loop including an expander bypass loop;
an expander arranged in the working fluid loop downstream from the exhaust cooler, the expander configured to drive an alternator;
a heater core in fluid communication with the coolant bypass loop and the expander bypass loop;
a bypass control system including at least one control valve arranged in the working fluid loop and configured to divert working fluid in the working fluid loop through the expander bypass loop around the expander and to the heater core in response to an operating condition of the hybrid power plant system; and
a pump arranged in the working fluid loop and driven by the expander in a charging mode, the at least one valve configured to divert working fluid in the working fluid loop through the expander bypass loop around the pump and to the heater core in response to the operating condition.

15. The system according to claim 14, comprising an HVAC system in fluid communication with a vehicle cabin and configured to provide heat thereto, the HVAC system including the heater core.

16. The system according to claim 14, comprising a condenser and a reservoir arranged in the working fluid loop and respectively arranged downstream from the expander.

17. The system according to claim 14, comprising a radiator arranged in the coolant loop, the at least one valve configured to divert working fluid in the liquid coolant loop through the coolant bypass loop around the radiator and from the heater core to the engine in response to the operating condition.

18. The system according to claim 17, comprising a coolant pump arranged in the coolant loop and configured to circulate coolant therethrough.

19. The system according to claim 14, wherein the operating condition is a cold start condition.

\* \* \* \* \*